US010698150B2

(12) United States Patent
Vrehen et al.

(10) Patent No.: US 10,698,150 B2
(45) Date of Patent: Jun. 30, 2020

(54) COMPOUND PARABOLIC COLLIMATOR ARRAY FOR HIGH INTENSITY LIGHTING

(71) Applicant: SIGNIFY HOLDING B.V., Eindhoven (NL)

(72) Inventors: Joris Jan Vrehen, Eindhoven (NL); Hendrik Johannes Boudewijn Jagt, Eindhoven (NL); Hugo Johan Cornelissen, Eindhoven (NL); Dirk Kornelis Gerhardus De Boer, Eindhoven (NL); Daniël Anton Benoy, Eindhoven (NL); Dominique Maria Bruls, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/078,718

(22) PCT Filed: Mar. 8, 2017

(86) PCT No.: PCT/EP2017/055478
§ 371 (c)(1),
(2) Date: Aug. 22, 2018

(87) PCT Pub. No.: WO2017/157742
PCT Pub. Date: Sep. 21, 2017

(65) Prior Publication Data
US 2019/0056546 A1    Feb. 21, 2019

(30) Foreign Application Priority Data

Mar. 15, 2016    (EP) .................................. 16160473

(51) Int. Cl.
*F21V 8/00*    (2006.01)
*F21K 9/64*    (2016.01)
*F21Y 115/10*    (2016.01)

(52) U.S. Cl.
CPC .......... *G02B 6/0003* (2013.01); *G02B 6/005* (2013.01); *G02B 6/0068* (2013.01);
(Continued)

(58) Field of Classification Search
CPC ...... G02B 6/0005–0008; G02B 6/0003; G02B 6/42; F21K 9/24; H04N 9/315–3167
See application file for complete search history.

(56) References Cited

U.S. PATENT DOCUMENTS

| 4,507,562 A | 3/1985 | Gasiot et al. |
| 7,663,152 B2 * | 2/2010 | Bierhuizen ........... H01L 33/644 257/98 |

(Continued)

FOREIGN PATENT DOCUMENTS

| CN | 102549493 A | 7/2012 |
| CN | 103968267 A | 8/2014 |

(Continued)

OTHER PUBLICATIONS

J. Chaves, Introduction to Nonimaging Optics (Optical Science and Engineering series; 134) 2008, Taylor & Francis Group. LLC, 512 pages.

*Primary Examiner* — Mariceli Santiago
(74) *Attorney, Agent, or Firm* — Daniel J. Piotrowski

(57) ABSTRACT

The invention provides a lighting device (1) comprising a plurality of light sources (100) configured to generate light source light (101), a plurality of light converter elements (200), wherein each light converter element (200) is radiationally coupled with one or more light sources (100), wherein the light sources (100) are configured at a non-zero distance from the light converter elements (200), wherein the light converter elements (200) are configured to convert at least part of the light source light into light converter light (201), the lighting device (1) further comprising a plurality of compound parabolic concentrators (300) configured in an
(Continued)

array (310), each compound parabolic concentrator (300) having a first end (301) and a second end (302), and having a shape tapering from the first end (301) to the second end (302), wherein the light converter elements (200) are configured at the second ends (302) of the compound parabolic concentrators (300), wherein the light converter elements (200) and the compound parabolic concentrators (300) are configured to provide light converter light (201) emanating from the first ends (301) of the compound parabolic concentrators (300), and wherein the light converter elements (200) are in thermal contact with a heat sink (400).

11 Claims, 7 Drawing Sheets

(52) U.S. Cl.
CPC .............. *G02B 6/0085* (2013.01); *F21K 9/64* (2016.08); *F21Y 2115/10* (2016.08)

(56) References Cited

U.S. PATENT DOCUMENTS

| | | | | |
|---|---|---|---|---|
| 7,857,457 | B2* | 12/2010 | Rutherford | G03B 21/2013 353/31 |
| 8,985,810 | B2 | 3/2015 | Woodgate et al. | |
| 9,004,701 | B2* | 4/2015 | Berben | A61B 18/22 353/99 |
| 9,033,530 | B2* | 5/2015 | Bruemmer | A61B 1/0653 362/84 |
| 9,519,204 | B2* | 12/2016 | Kimura | H04N 9/315 |
| 2005/0270775 | A1* | 12/2005 | Harbers | G02B 27/1046 362/231 |
| 2006/0227570 | A1* | 10/2006 | Rutherford | H04N 9/315 362/612 |
| 2010/0202129 | A1* | 8/2010 | Abu-Ageel | C09K 11/7734 362/84 |
| 2013/0107226 | A1 | 5/2013 | Aksenov | |
| 2013/0314893 | A1 | 11/2013 | Paquette | |
| 2015/0109773 | A1 | 4/2015 | Li et al. | |
| 2015/0267897 | A1 | 9/2015 | Brukilacchio et al. | |
| 2016/0054501 | A1 | 2/2016 | Hikmet et al. | |
| 2016/0076735 | A1* | 3/2016 | Wang | G01N 21/6456 362/84 |
| 2017/0315433 | A1* | 11/2017 | Ronda | C04B 35/6455 |

FOREIGN PATENT DOCUMENTS

| | | |
|---|---|---|
| CN | 104298060 A | 1/2015 |
| DE | 19845229 C1 | 3/2000 |
| WO | WO2009115976 A1 | 9/2009 |
| WO | WO2015028334 A1 | 3/2015 |
| WO | WO2015067476 A1 | 5/2015 |
| WO | WO2015113979 A1 | 8/2015 |
| WO | WO2015185469 A1 | 12/2015 |

* cited by examiner

COMPOUND PARABOLIC COLLIMATOR ARRAY FOR HIGH INTENSITY LIGHTING

CROSS-REFERENCE TO PRIOR APPLICATIONS

This application is the U.S. National Phase application under 35 U.S.C. § 371 of International Application No. PCT/EP2017/055478, filed on Mar. 8, 2017, which claims the benefit of European Patent Application No. 16160473.1, filed on Mar. 15, 2016. These applications are hereby incorporated by reference herein.

FIELD OF THE INVENTION

The invention relates to a lighting device, especially for high intensity lighting. The invention further relates to a lighting system comprising such lighting device.

BACKGROUND OF THE INVENTION

Arrays of light emitting elements are known in the art. U.S. Pat. No. 8,985,810, for instance, describes an illumination apparatus and method of manufacture of the same in which an array of light-emitting elements is aligned to an array of optical elements to achieve a thin and efficient light source that can also be arranged to provide directional and/or programmable illumination. Amongst others, this document describes an illumination apparatus, comprising a plurality of light-emitting elements from a monolithic wafer arranged in an array with their original monolithic wafer positions and orientations relative to each other preserved; and a plurality of optical elements arranged in an array; wherein the light-emitting element array is aligned with the optical element array such that the light-emitting elements are aligned with the optical elements; wherein in at least one direction, for at least one pair of the plurality of light-emitting elements in the at least one direction, for each respective pair there was at least one respective light-emitting element in the monolithic wafer that was positioned in the monolithic wafer between the pair of light-emitting elements in the at least one direction and that is not positioned between them in the array of light-emitting elements.

WO 2015/185469 A1 discloses a lighting device which comprises a luminescent concentrator. The luminescent concentrator comprises a waveguide which has a radiation input face, a radiation exit face, and a width which is defined by the radiation input face and an opposite face. The waveguide comprises a radiation converter element which is distributed in the waveguide with a radiation converter concentration. The waveguide comprises a single crystal or a ceramic. A solid state light source is configured to irradiate the radiation input face of the waveguide with solid state light source radiation. The radiation converter element is configured to absorb at least part of the light source radiation and to convert into radiation converter element radiation. The radiation converter concentration is selected at least three times higher than necessary to absorb 98% of the light source radiation over the width of the waveguide.

WO 2015/067476 A1 discloses a light emitting device which comprises a plurality of first solid state light sources which is adapted to, in operation, emit first light with a first spectral distribution. A first light guide comprises a first light input surface, a first end surface extending in an angle different from zero with respect to each other and at least one first further surface extending parallel to the first light input surface. The plurality of first solid state light sources is arranged at the first light input surface. The first light guide is adapted to receive the first light with the first spectral distribution at the first light input surface, and guide at least a part of the first light with the first spectral distribution to the first end surface. The light emitting device further comprises at least one first optical element, which is adapted to shape light that is coupled out of the first light guide through at least a part of the at least one first further surface such as to provide a first shaped light. At least one second optical element is arranged at or on the first end surface.

SUMMARY OF THE INVENTION

Compound Parabolic Concentrators or CPCs are well-known optical devices which are used to concentrate light which is received within the acceptance angle of the CPC. It further appears that CPCs can also be used the other way around, in order to collimate the light from a flat light source. In such instance, the CPC is used in transmissive mode. An advantage of a CPC is that the etendue of the beam may be maintained. The CPC design can be rotationally symmetric resulting in a circular entrance and exit window. Depending on the application and light source, CPCs can also be made with a square or rectangular entrance and exit surface. Even then, the etendue may still largely be maintained. The CPC can be either hollow using reflectors to create the parabolic surfaces or made of a material like glass with a higher index of refraction using total internal reflection. CPCs may e.g. be used for digital projection applications, such as in combination with a green (luminescent concentrator) application.

When increasing the power of the light provided to the luminescent material, thermal aspect may become important. Another issue with CPCs may be that the intensity profile over the exit of the CPC (assuming a Lambertian light source) is not homogeneous, which can be a drawback for certain applications.

Hence, it is an aspect of the invention to provide an alternative lighting device, which preferably further at least partly obviates one or more of above-described drawbacks. Amongst others, the invention suggests to split up the single CPC and single source into an array of smaller CPCs and smaller sources.

Hence, in a first aspect the invention provides a lighting device ("device") comprising a light source, even more especially comprising a plurality of light sources, configured to generate light source light, a plurality of light converter elements, wherein each light converter element (or "light converter" or "converter element") is radiationally coupled with one or more light sources, wherein the light source(s) is (are) especially configured at a non-zero distance (d) from the light converter elements, wherein the light converter elements are configured to convert at least part of the light source light into light converter light ("converter light"), the lighting device further comprising a plurality of compound parabolic concentrators configured in an array, each compound parabolic concentrator having a first end and a second end, and having a shape tapering from the first end to the second end, wherein the light converter elements are configured at the second ends of the compound parabolic concentrators, wherein the light converter elements and the compound parabolic concentrators are configured to provide (concentrated) light converter light emanating from the first ends of the compound parabolic concentrators, and wherein especially the light converter elements are in thermal contact with a heat sink, wherein the light sources are configured to irradiate the light converter elements via the compound parabolic concentrators.

With such lighting device, high intensity light may be provided while thermal energy may efficiently be dissipated. Further, with such lighting device a relative homogeneous light distribution (of the light converter light) may be provided (downstream from the CPCs). Further, the thickness or depth of such lighting device may be minimized.

As indicated above, especially the lighting device comprises a plurality of light sources. The light sources may include laser light sources. Each light converter element may be irradiated with a single light source, such as a laser light source. However, in embodiments one or more light converter element may be irradiated with more than one light source, i.e. a plurality of light sources. Hence, in embodiments the number of light sources may be equal to the number of light converter element; however, in other embodiments the number of light sources is larger than the number of light converter element, such as at least two times larger, like 10 times larger. However, in yet other embodiments two or more light converter elements of a plurality of light converter elements, which plurality of light converter elements are especially arranged in a n×m array (with n and m (independently) both equal to or larger than 2), are irradiated by a single light source, especially a laser. Hence, the device may comprise a number of light sources smaller, equal to or larger than the number of light converter elements, in embodiments especially equal to or larger than the number of light converter elements. Assuming more than one light source, in embodiment the light sources may be controlled with a control system. For instance, in this way light intensity of the light emanating from the device (device light) may be controlled. Optionally, in this way also the beam shape of the light emanating from the device may be controlled.

Especially, the light sources are light sources that during operation emit (light source light) at least light at a wavelength selected from the range of 200-490 nm, especially light sources that during operation emit at least light at wavelength selected from the range of 400-490 nm, even more especially in the range of 440-490 nm. This light may partially be used by a luminescent material (comprised by the light converter element; see also below). Hence, in a specific embodiment, the light source is configured to generate blue light. In a specific embodiment, the light source comprises a solid state (LED) light source (such as a LED or laser diode). The term "light source" may also relate to a plurality of light sources. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light converter element, such as a light transmissive body (see also below). The light source(s) may in embodiments comprise a solid state laser(s).

Hence, in embodiments the lighting device comprises a plurality of light sources. Especially, the light source light of the plurality of light sources have spectral overlap, even more especially, they are of the same type and provide substantial identical light (having thus substantial the same spectral distribution). Hence, the light sources may substantially have the same emission maximum ("peak maximum"), such as within a bandwidth of 10 nm, especially within 8 nm, such as within 5 nm (binning).

The light sources are especially configured to provide a blue optical power ($W_{opt}$) of at least 0.2 Watt/mm$^2$ to the light transmissive body, i.e. one or more radiation input face(s). The blue optical power is defined as the energy that is within the energy range that is defined as blue part of the spectrum (see also below).

Especially, the photon flux (of the light source light) is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time. However, the invention is not limited to blue light source light.

In yet a further embodiment, especially for projector applications, the plurality of light sources are operated in pulsed operation with a duty cycle selected from the range of 10-80%, such as 25-70%.

Further, as indicated above the lighting device comprises a plurality of light converter elements. In embodiments, the light converter elements are especially configured to concentrate light. The terms "light concentrator element" or "luminescent concentrator" are especially applied for those light converter elements that are configured to be irradiated with two or more light sources. Such light is coupled into the light converter element and thereby, light is concentrated. Herein, the term "light converter element" is applied, especially to indicate that the light converter is a body or element. Hence, especially the light converter elements comprise luminescent bodies.

For instance, in embodiments the light converter may include a ceramic luminescent material provided as ceramic body. Therefore, in embodiments the light converter elements comprise luminescent ceramic material. In yet other embodiments, the light converter element comprises a light transmissive material with quantum dots (luminescent quantum dots) and/or organic luminescent materials embedded therein. Hence, the light converter element may include a light transmissive body including quantum dots (luminescent quantum dots) and/or organic luminescent materials embedded therein. In yet other embodiments, the light converter element comprises a single crystal (luminescent single crystal). Therefore, in yet further embodiments the invention also provides light converter elements comprising luminescent single crystals. In yet other embodiments, the invention also provides light converter elements comprising luminescent glasses. In yet other embodiments, the invention also provides light converter elements comprising luminescent poly crystalline bodies. Especially, a poly crystalline body substantially consists of a plurality of crystallites of the same material, as known in the art. Combinations of different light converter elements may also be applied, such as one or more glasses and one or more single crystals and one or more ceramic bodies.

Light converter elements may differ in one or more of dimensions, luminescent material, luminescent material concentration, etc. Each light converter element especially has at least one radiation input face (configured to receive light source light) and a light exit window (for light converter light escaping from the light converter). The light exit window is a part of the light converter element from which light escapes when the light converter element is irradiated with the light source light. Hence, one or more faces of the light converter element may be configured as light exit face, amongst others dependent upon the configuration of the light source(s). This is known in the art, see e.g. WO2010/049875 and WO2015185469, which are herein incorporated by reference. When light converter elements are irradiated with the light source light via the CPC, the radiation input face and the light exit window may coincide. Further information concerning light converter elements is also described below. The light converter element provides, upon irradiation with the light source light, light converter light, due to the presence of the luminescent material. The light converter light escaping from a light exit window of the light converter element may have a substantially Lambertian distribution.

Especially, the lighting device comprises at least two light converter elements, such as at least four light converter elements, like in the range of 4-2500 light converter elements. For digital projector applications, the lighting device may e.g. include 2-100 light converter elements for a specific color (as the digital projector is especially RGB based). For other lighting applications, such as outdoor lighting applications, the lighting device may include 2-2500 light converter elements, such as at least 100 light converter elements.

Each light converter element is radiationally coupled with one or more light sources. The term "radiationally coupled" especially means that the light source and the light converter element are associated with each other so that at least part of the radiation emitted by the light source is received by the light converter element (and at least partly converted into luminescence). As indicated above, the light converter comprises luminescent material. Hence, the light converter elements are configured to convert at least part of the light source light into light converter light. The luminescent material converts at least part of the light source light, and thereby generated the light converter light.

Especially, the light sources are configured at non-zero distances (d) from the light converter elements. Hence, there may be no (direct) physical contact between the light source(s) and the light converter element(s). Physical contact may lead to an undesired outcoupling of light from the light converter at the position of the light source. The distance may e.g. be in the range of 0.1-50 mm, such as 1-20 mm. Here, the term distance especially refers to the distance between light source and light converter element measured along an optical axis of the light source. In embodiments the distances are substantially equal but in other embodiments distances may differ, such as two or more subsets of light sources and light converter elements having different distances.

When the light converter is irradiated via the CPC, the distance between the light source and light converter element is by definition non-zero, and may also be larger than 20 mm, even larger than 50 mm. Hence, the light sources are configured to irradiate the light converter elements via the compound parabolic concentrators. Such configurations allow a high thermal contact with the heat sink. Especially when the light converter element is irradiated via the CPC, the device may further comprise optics, such as a dichroic mirror, for separating light source light and light converter light. Yet further, when the light converter element is irradiated via the CPC the light sources may especially comprise lasers.

Hence, the distance between a LED die and the (respective) light converter element may be at least 0.1 mm, like at least 1 mm.

In other embodiments, the light source(s) is (are) configured to edge light the light converter elements. Such embodiments allow a high concentration of light, as each light converter element may be edge lit by a plurality of light sources. In such embodiments, the light sources may comprise LEDs and/or lasers. Further, in such embodiments the light converter element may especially be indicated as light concentrator. Especially, the light converter element in such embodiments comprises an elongated luminescent body (see also below).

Yet further, as indicated above the lighting device especially comprises a plurality of compound parabolic concentrators. Each CPC is configured to receive light converter light from a light converter element. Especially, each CPC is configured downstream of a light exit window of a light converter element. Hence, especially the number of CPC is identical to the number of light converter elements. Further, especially the light converter element and CPC are adapted to each other, see also below. For instance, the light converter element(s) may have a light exit window(s) having substantially the same shape(s) and dimensions as the second end(s) of the (respective) CPCs. Hence, the CPC may receive light converter light at a second. Light converter light (especially concentrated light converter light) may escape from the first end of the CPC. Especially, the etendue of the beam (light converter light) may be maintained.

Each compound parabolic concentrator has a first end and a second end. Further, each CPC has a shape tapering from the first end to the second end. Hence, the first end especially has a larger cross-section than the second end. CPCs are especially designed to efficiently collect and concentrate distant light sources. CPCs are known in the art and are e.g. described in U.S. Pat. No. 5,727,108, EP1024669, etc., which are herein incorporated by reference. Compound Parabolic Concentrator (CPC) or nonimaging optics that substantially maintain the etendu of light source but do not image the source, see for instance Introduction to non imaging optics, Julio Chaves; ISBN-13: 978-1-4200-5429-3; chapter 1.3. Further, in specific embodiments the CPC are substantially identical (shape and dimensions, even more especially shape, dimensions and material). Hence, in embodiments the CPCs are especially configured to provide substantially identical beams of light (assuming each CPC receives substantially identical beams of light).

The light converter elements are configured at the second ends of the compound parabolic concentrators. The compound parabolic concentrators are especially configured to receive light converter light from the (respective) light converter elements at their second ends. In this way, the CPC may concentrate the light escaping from the light converter element (especially its light exit window). Hence, in this way the light converter elements and the compound parabolic concentrators are configured to provide (concentrated) light converter light emanating from the first ends of the compound parabolic concentrators. The light converter elements are especially configured in an array. Hence, also the CPCs are configured in an array. Light converter light emanating from the CPC is herein also indicated as device light.

Hence, in embodiments the array comprises n×m compound parabolic concentrators, wherein n≥2 and wherein m≥2. For instance, n and m may thus each independently selected from the range of 2-2500 (see also above). Hence, n may be larger than m, or m may be larger than n, or n=m.

The dimensions of the CPCs and/or the number of the CPCs may be chosen such, that a desired aspect ratio is achieved. Hence, in embodiments the array has an array length (L1) and an array width (W1) having a ratio L1:W1 selected from 16:9. Such embodiments may especially be of interested for digital projector applications.

For thermal management, the light converter elements are in thermal contact with a heat sink. Especially, the thermal contact includes a physical contact. Additionally or alternatively, a thermally conductive material (such as e.g. a silicone glue layer or other thermally conductive adhesive) may be configured between the heat sink and the light converter element. Especially, such intermediate layer has an index of refraction lower than that of the light converting material, such as at least 10%, even more especially at least 20% lower. The heat sink may in embodiments include cavities for hosting part of the light converter element(s). In specific embodiments, each light converter element comprises two or more faces in physical contact with the heat sink. In this way, thermal energy may be dissipated efficiently. In yet further embodiments, the light converter elements comprise elongated luminescent bodies, wherein the heat sink at least partly perimetrically surrounds the light converter elements. Also in this way thermal energy may be dissipated efficiently. In yet other embodiments, the light converter elements comprise plates or disks, with such plates or disks comprising two faces bridged by an edge, wherein an edge height is substantially smaller (such as at least 5 times) than a length and/or a width. Such plate or disk may thus include two (large) faces and an edge, wherein one of the (large) faces is in thermal contact with the heat sink. Optionally, also at least part of the edge may be in thermal contact with the heat sink.

The heat sink is configured to facilitate cooling of the (solid state) light source and/or light converter element, especially at least of the latter. The heat sink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. All light converter elements may be in thermal contact with the same heat sink. In alternative embodiments, the device comprises a plurality of heat sinks Hence, the term "heat sink" may also refer to a plurality of heat sinks. As indicated herein, in specific embodiments the term "thermal contact" may refer to physical contact.

Especially, the first ends of the CPCs are comprised in a single plane, especially a substantially flat plane. Especially, the second ends of the CPCs are comprised in a(nother) single plane, especially (also) a substantially flat plane.

Light from the light converter elements may escape from the first ends of the CPCs. The device may further comprise a window or light exit window, wherein the light exit window is configured downstream of the first ends of the compound parabolic concentrators or wherein the light exit window comprises the first ends of the compound parabolic concentrators. In embodiments, the light exit window and CPCs form a single body. Alternatively or additionally, the CPCs form a single body. Hence, in embodiments the compound parabolic concentrators, optionally together with the light exit window according to claim 13, are configured as a single body. It is noted that the CPCs may be massive or hollow. Also combinations of different types of CPCs may be applied. The light exit window may optionally comprise a diffuser. Alternatively or additionally, downstream from the light exit window a diffuser may be configured.

Here below, some further embodiments of the light converter elements are described, especially in relation to "light concentrators" or "luminescent concentrators". However, the below embodiments may not only especially relate to light concentrators but also to light converter elements in general.

Each light converter element comprises a light transmissive body. The light converter elements are especially described in relation to an elongated light transmissive body, such as a ceramic rod. However, these aspects may also be relevant for other shaped ceramic bodies.

The light transmissive body has light guiding or wave guiding properties. Hence, the light transmissive body is herein also indicated as waveguide or light guide. As the light transmissive body is used as light converter element, the light transmissive body is herein also indicated as light converter element. The light transmissive body will in general have (some) transmission of visible light in a direction perpendicular to the length of the light transmissive body. Without the activator such as trivalent cerium, the transmission in the visible might be close to 100%.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam like or rod like, however especially beam like (cuboid like). However, the light transmissive body may also be disk like, etc. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape and is further configured to provide a single exit window.

In a specific embodiment, the light transmissive body may especially have an aspect ratio larger than 1, i.e. the length is larger than the width. In general, the light transmissive body is a rod or bar (beam), though the light transmissive body does not necessarily have a square, rectangular or round cross-section. In general, the light source is configured to irradiate one of the longer faces (side edge), herein indicated as radiation input face, and radiation escapes from a face at a front (front edge), herein indicated as radiation exit window. Especially, in embodiments the solid state light source, or other light source, is not in physical contact with the light transmissive body. Physical contact may lead to undesired outcoupling and thus a reduction in concentrator efficiency. Further, in general the light transmissive body comprises two substantially parallel faces, the radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive or digital projectors, a small but high intense emissive surface is desired. This cannot be obtained with a single LED, but can be obtained with the present lighting device. Especially, the radiation exit window has a radiation exit window area (E) selected from the range of 1-100 mm². With such dimensions, the emissive surface can be small, whereas nevertheless high brightness may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm. The light transmissive body is thus especially an integral body, having the herein indicated faces.

The generally rod shaped or bar shaped light transmissive body can have any cross sectional shape, but in embodiments has a cross section the shape of a square, rectangle, round, oval, triangle, pentagon, or hexagon. Generally the ceramic bodies are cuboid, but may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a width (W) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, such as 10-20 cm.

Especially, the light transmissive body has a width (W) selected to absorb more than 95% of the light source light. In embodiments, the light transmissive body has a width (W) selected from the range of 0.05-4 cm, especially 0.1-2 cm, such as 0.2-1.5 cm. With the herein indicated cerium concentration, such width is enough to absorb substantially all light generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heat sinks. The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the lighting device further comprises a reflector configured to reflect luminescent material light back into the light transmissive body. Therefore, the lighting device may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the lighting device further comprises an optical reflector (at least) configured downstream of the first face and configured to reflect light back into the elongated light transmissive body. Alternatively or additionally, optical reflectors may also be arranged at other faces and/or parts of faces that are not used to couple light source light in or luminescence light out. Especially, such optical reflectors may not be in physical contact with the light transmissive body. Further, such optical reflector(s) may be configured to reflect one or more of the luminescence and light source light back into the light transmissive body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face. In embodiments, the light exit window and light input face are configured perpendicular to each other. However, the invention is not limited to such embodiments. The light exit window and light input face may also be configured relative to each other with an angle larger than 0° and smaller than 90°. However, in other embodiments, wherein the CPC is used in transmissive mode, the light input face and light exit window may substantially be identical.

Downstream of the radiation exit window, optionally an optical filter may be arranged. Such optical filter may be used to remove undesired radiation. For instance, when the lighting device should provide red light, all light other than red may be removed. Hence, in a further embodiment the lighting device further comprises an optical filter configured downstream of the radiation exit window and configured to reduce the relative contribution of non-red light in the converter light (downstream of the radiation exit window). For filtering out light source light, optionally an interference filter may be applied. Likewise this may apply to another color, when a color other than green and red is desired.

The lighting device may further include one or more cooling elements configured to cool the light transmissive body.

Each light converter element comprises a luminescent material configured to convert at least part of a pump radiation received at one or more radiation input faces into luminescent material light, and each light converter element configured to couple at least part of the luminescent material light out at the radiation exit window as converter light.

Therefore, in embodiments a plurality of light sources, especially solid state light sources, are configured to provide light source light as first pump radiation to the radiation input faces of a plurality of light converter elements. In the light converter elements the pump radiation is converted and the concentrators generate luminescent material light to provide this light downstream from the radiation exit window. Hence, said plurality of light converter elements, are configured to provide luminescent material light at the respective radiation exit windows of the light converter elements as converter light.

The phrase "configured to provide luminescent material light at the radiation exit window" and similar phrases especially refers to embodiments wherein the luminescent material light is generated within the light converter element (i.e. within the light transmissive body), and part of the luminescent material light will reach the radiation exit window and escape from the light converter element. Hence, downstream of the radiation exit window the luminescent material light is provided. The converter light, downstream of the radiation exit window comprises at least the luminescent material light escaped via the radiation exit window from the light converter. Instead of the term "converter light" also the term "light converter element light" may be used. Pump radiation can be applied to a single radiation input face or a plurality of radiation input faces.

Likewise, this may apply to the pump radiation of the light sources applied to one or more radiation input faces of the (concomitant) light converter element. Note that above indicated dimensions like length, ratio, etc., may thus differ for each light converter element, though in embodiments the light converter elements may all be substantially identical. Hence, in embodiments the plurality of light converter elements includes two or more subsets of light converter elements having different lengths (L). In yet further embodiments, the plurality of light converter elements all substantially have identical lengths (L).

In embodiments, the length (L) is selected from the range of 5-50 cm. In yet other embodiments, the length (L) may be selected from the range of 0.5-50 mm, such as 1-20 mm, like 1-10 mm. This may thus apply to all light converter elements. However, the range indicates that the different light converter elements may have different lengths within this range.

Especially, each light converter element comprises a body axis (BA). In yet further embodiments, the elongated light transmissive body of one or more light converter elements comprise an elongated ceramic body. For instance, luminescent ceramic garnets doped with $Ce^{3+}$ (trivalent cerium) can be used to convert blue light into light with a longer wavelength, e.g. within the green to red wavelength region, such as in the range of about 500-750 nm. To obtain sufficient absorption and light output in desired directions, it is advantageous to use transparent rods (especially substantially shaped as beams). Such rod can be used as light converter element, concentrating over their length light source light from light sources such as LEDs (light emitting diodes), converting this light source light into converter light and providing at an exit surface a substantial amount of converter light. Lighting devices based on light converter elements may e.g. be of interest for projector applications. For projectors, red and green light converter elements are of interest. Green luminescent rods, based on garnets, can be relatively efficient. Such concentrators are especially based on YAG:Ce (i.e. $Y_3Al_5O_{12}:Ce^{3+}$) or LuAG ($Lu_3Al_5O_{12}:Ce^{3+}$). 'Red' garnets can be made by doping a YAG-garnet with Gd ("YGdAG"). Doping of Gd, however, results in a lower thermal stability (thermal quenching). Red-shifting can also be obtained using a high Ce concentration, with a much smaller penalty for thermal stability.

Hence, especially the elongated light transmissive body comprises a ceramic material configured to wavelength convert at least part of the (blue) light source light into converter light in the red, which converter light at least partly escapes from the radiation exit window. The ceramic material especially comprises an $A_3B_5O_{12}:Ce^{3+}$ ceramic material ("ceramic garnet"), wherein A comprises yttrium (Y) and gadolinium (Gd), and wherein B comprises aluminum (Al). As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated light transmissive body per se, i.e. an elongated light transmissive body having a first face and a second face, these faces especially defining the length (L) of the elongated light transmissive body, the elongated light transmissive body comprising one or more radiation input faces and a radiation exit window, wherein the second face comprises said radiation exit window, wherein the elongated light transmissive body comprises a ceramic material configured to wavelength convert at least part of (blue) light source light into converter light, such as (at least) red converter light (which at least partly escapes from the radiation exit window when the elongated light transmissive body is irradiated with blue light source light), wherein the ceramic material comprises an $A_3B_5O_{12}:Ce^{3+}$ ceramic material as defined herein. Such light transmissive body can thus be used as light converter. Especially, such light transmissive body has the shape of a cuboid.

As indicated above, the ceramic material comprises a garnet material. Hence, the elongated body especially comprises a luminescent ceramic. The garnet material, especially the ceramic garnet material, is herein also indicated as "luminescent material". The luminescent material comprises an $A_3B_5O_{12}:Ce^{3+}$ (garnet material), wherein A is especially selected from the group consisting of Sc, Y, Tb, Gd, and Lu (especially at least Y and Gd), wherein B is especially selected from the group consisting of Al and Ga (especially at least Al). More especially, A (essentially) comprises yttrium (Y) and gadolinium (Gd), and B (essentially) comprises aluminum (Al). Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3Al_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.005-0.035. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

After obtaining the light transmissive body, the body may be polished. Before or after polishing an annealing process (in an oxidative atmosphere) may be executed, especially before polishing. In a further specific embodiment, said annealing process lasts for at least 2 hours, such as at least 2 hours at at least 1200° C. Further, especially the oxidizing atmosphere comprises for example $O_2$.

Instead of cerium doped garnets, or in addition to such garnets, also other luminescent materials may be applied, e.g. embedded in organic or inorganic light transmissive matrixes, as light converter element. For instance quantum dots and/or organic dyes may be applied and may be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphode (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Several color conversion schemes may be possible. Especially, however, the Stokes shift is relatively small. Especially, the Stokes shift, defined as the difference (in wavelength) between positions of the band maxima of the light source used for pumping and the light which is emitted, is not larger than 100 nm; especially however, the Stokes shift is at least about 10 nm, such as at least about 20 nm. This may especially apply to the light source light to luminescent material light conversion, but also apply to the second pump radiation to second luminescent material light conversion, etc.

In embodiments, the plurality of light sources are configured to provide UV radiation as pump radiation, and the light converter elements are configured to provide one or more of blue and green converter light. In yet other embodiments, the plurality of light sources are configured to provide blue radiation as pump radiation, and the light converter elements are configured to provide one or more of green and yellow converter light. Note, as also indicated below, such embodiments may also be combined.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc.

In yet a further aspect, the invention provides a projector comprising the lighting device as defined herein. As indicated above, of course the light projector may also include a plurality of such lighting devices.

In yet a further aspect, the invention also provides a lighting system configured to provide lighting system light, the lighting system comprising one or more lighting devices as defined herein and optionally one or more second lighting devices configured to provide second lighting device light, wherein the lighting system light comprises (a) one or more of (i) said second converter light as defined herein and (ii) said third converter light as defined herein, and optionally (b) second lighting device light. Hence, the invention also provides a lighting system configured to provide visible light, wherein the lighting system comprises at least one lighting device as defined herein. For instance, such lighting system may also comprise one or more (additional) optical elements, like one or more of optical filters, collimators, reflectors, wavelength converters, etc. The lighting system may be, for example, a lighting system for use in an automotive application, like a headlight. Hence, the invention also provides an automotive lighting system configured to provide visible light, wherein the automotive lighting system comprises at least one lighting device as defined herein and/or a digital projector system comprising at least one lighting device as defined herein. Especially, the lighting device may be configured (in such applications) to provide red light. The automotive lighting system or digital projector system may also comprise a plurality of the lighting devices as described herein. Hence, the invention also provides a lighting system, especially selected from the group consisting of an entertainment lighting system and a digital projector, comprising one or more lighting devices as defined herein.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of about 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
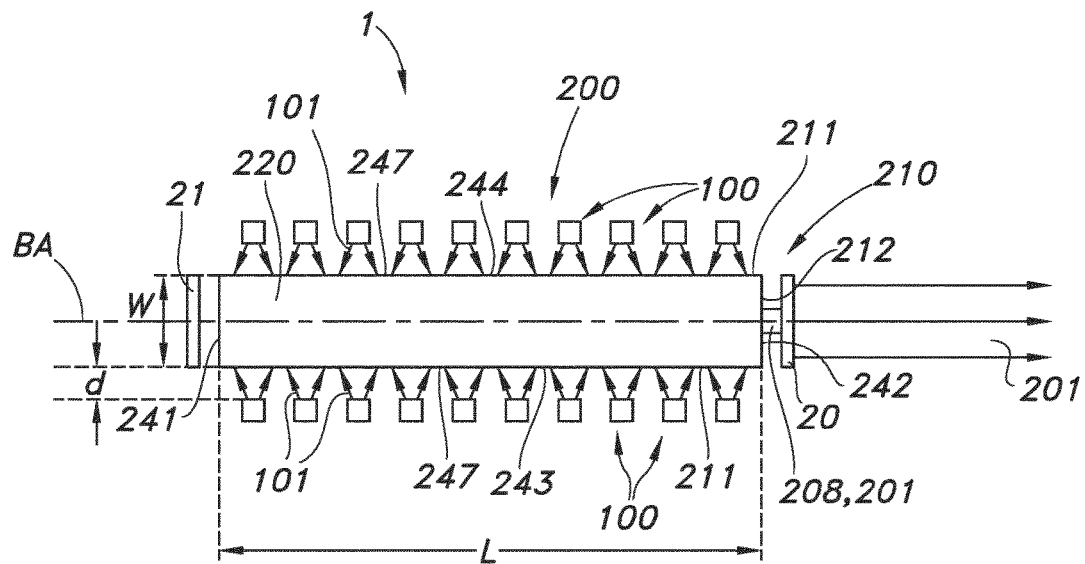
FIGS. 1a-1e schematically depict some aspects of the invention.

An embodiment of the lighting device as defined herein is schematically depicted in FIG. 1a. FIG. 1a schematically depicts a lighting device 1 comprising a plurality of solid state light sources 100 and a light converter element 200 comprising an (elongated) light transmissive body 210 having a first face 241 and a second face 242 ("nose of the rod") defining a length L of the elongated light transmissive body 210. The elongated light transmissive body 210, especially a ceramic body, comprising one or more radiation input faces 211, here by way of example two oppositely arranged faces, indicated with references 243 and 244 (which define e.g. the width W), which are herein also indicated as edge faces or edge sides 247. Further the light transmissive body 210 comprises a radiation exit window 212, wherein the second face 242 comprises said radiation exit window 212. The entire second face 242 may be used or configured as radiation exit window. The plurality of solid state light sources 100 are configured to provide (blue) light source radiation 101 to the one or more radiation input faces 211.

As indicated above, they especially are configured to provide to at least one of the radiation input faces 211 a blue power $W_{opt}$ of in average at least 0.067 Watt/mm². Reference BA indicates a body axis, which will in cuboid embodiments be substantially parallel to the edge sides 247.

The elongated light transmissive body 210 comprises a ceramic material 220 configured to wavelength convert at least part of the (blue) light source radiation 101 into converter light 201, such as at least one or more of green and red converter light 201. As indicated above the ceramic material 220 comprises an $A_3B_5O_{12}:Ce^{3+}$ ceramic material, wherein A comprises e.g. one or more of yttrium (Y), gadolinium (Gd) and lutetium (Lu), and wherein B comprises e.g. aluminum (Al). References 20 and 21 indicate optics, such as an optical filter and a reflector, respectively. The former may reduce e.g. non-green light when green light is desired or may reduce non-red light when red light is desired. The latter may be used to reflect light back into the light transmissive body or waveguide, thereby improving the efficiency. Note that more reflectors than the schematically depicted reflector may be used.

The light sources may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source radiation in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 100 are configured to provide light source radiation 101, which is used as pump radiation. The luminescent material 220 converts the light source radiation into luminescent material light 208. Light escaping at the light exit window 212 is indicated as converter light 201, and will include luminescent material light 208. Note that due to reabsorption part of the luminescent material light 208 within the light converter element 200 may be reabsorbed. Hence, the spectral distribution may be redshifted relative e.g. a low doped system and/or a powder of the same material.

Figure 1B:
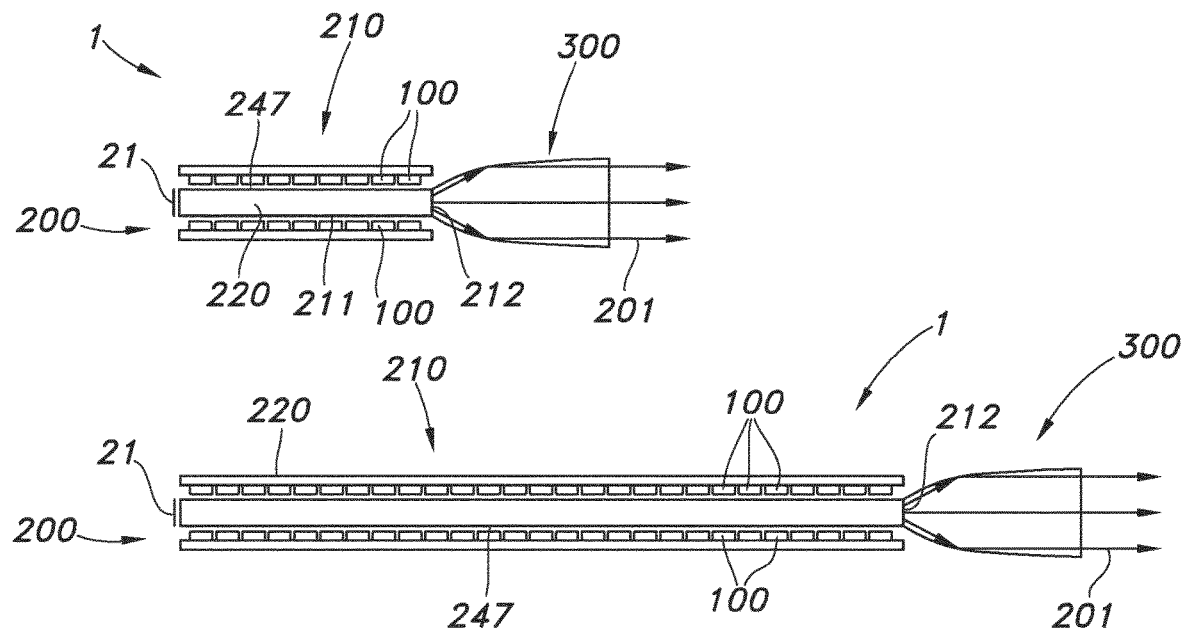

FIGS. 1a-1b schematically depict similar embodiments of the lighting device. Further, the lighting device may include further optical elements, either separate from the waveguide and/or integrated in the waveguide, like e.g. a light concentrating element, such as a compound parabolic light concentrating element (CPC). The lighting devices 1 in FIG. 1b further comprise a collimator 300, especially a CPC.

Figure 1C:
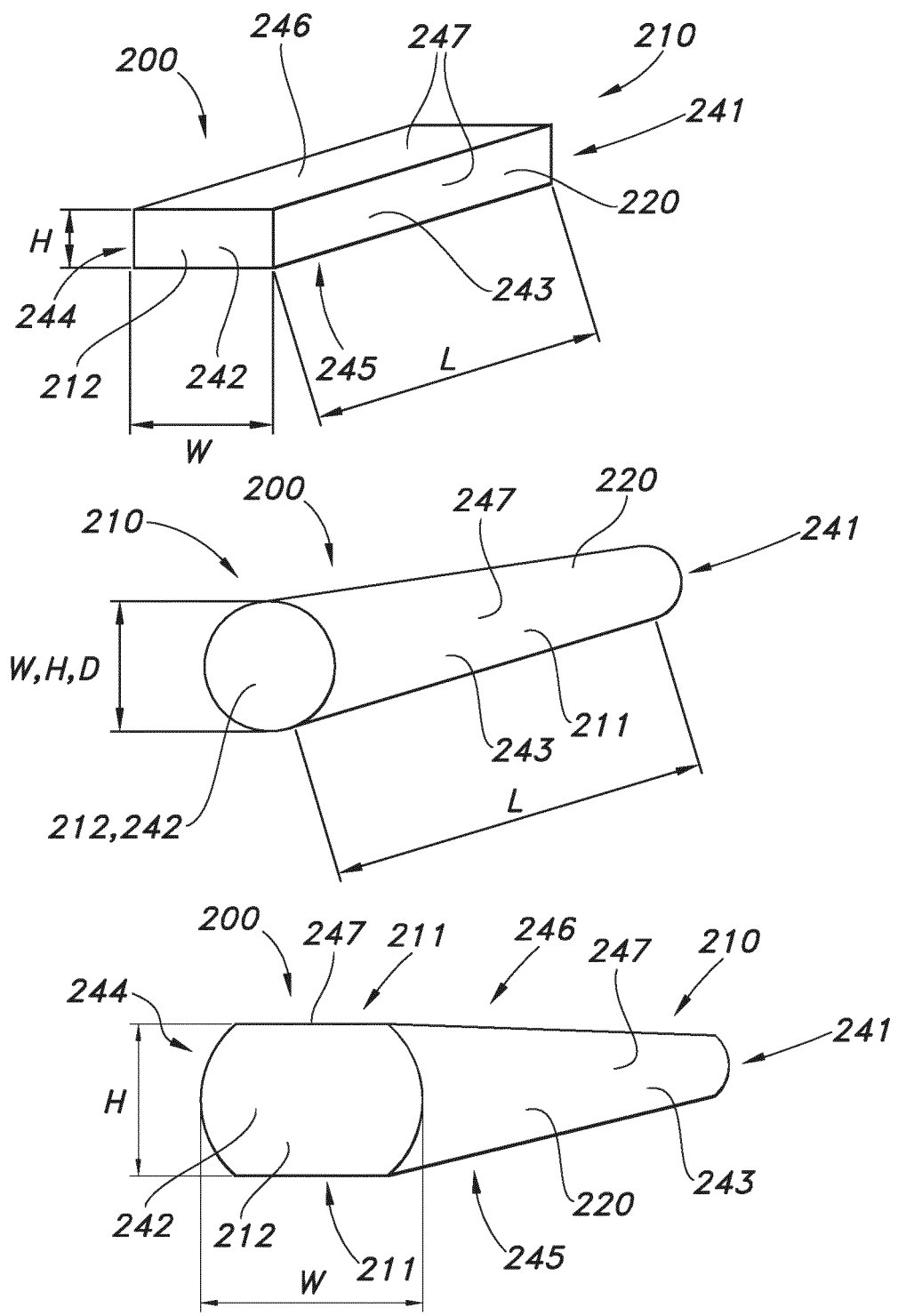

FIG. 1c schematically depicts some embodiments of possible ceramic bodies as waveguides or light converter elements. The faces are indicated with references 241-246. The first variant, a plate-like or beam-like light transmissive body has the faces 241-246. Light sources, which are not shown, may be arranged at one or more of the faces 243-246. The second variant is a tubular rod, with first and second faces 241 and 242, and a circumferential face 243. Light sources, not shown, may be arranged at one or more positions around the light transmissive body. Such light transmissive body will have a (substantially) circular or round cross-section. The third variant is substantially a combination of the two former variants, with two curved and two flat side faces. The variants shown in FIG. 1c are not limitative. More shapes are possible; i.e. for instance referred to WO2006/054203, which is incorporated herein by reference. The ceramic bodies, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-100, such as 10-60, like 10-20. Unless indicated otherwise, the term "aspect ratio" refers to the ratio length/width.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Figure 1D:
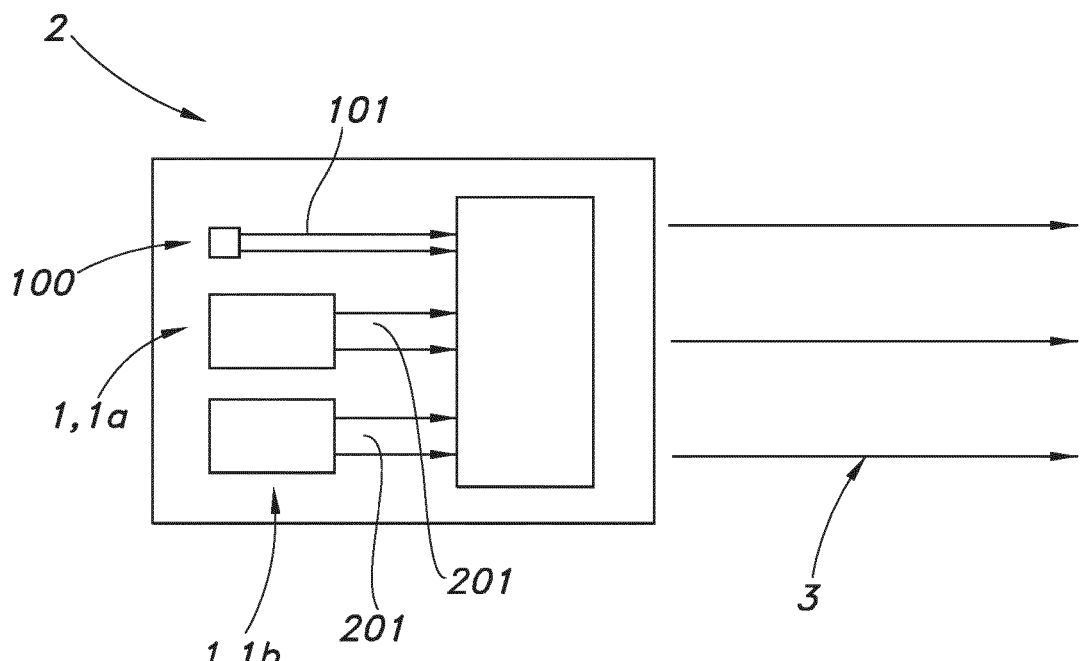

FIG. 1d very schematically depicts a projector or projector device 2 comprising the lighting device 1 as defined herein. By way of example, here the projector 2 comprises at least two lighting devices 1, wherein a first lighting device (1a) is configured to provide e.g. green light 201 and wherein a second lighting device (1b) is configured to provide e.g. red light 201. Light source 100 is e.g. configured to provide blue light. These light sources may be used to provide the projection 3. Note that the additional light source 10, configured to provide light source radiation 101, is not necessarily the same light source as used for pumping the light converter element(s). Further, here the term "light source" may also refer to a plurality of different light sources.

High brightness light sources are interesting for various applications including spots, stage-lighting, headlamps and digital light projection.

Figure 1E:
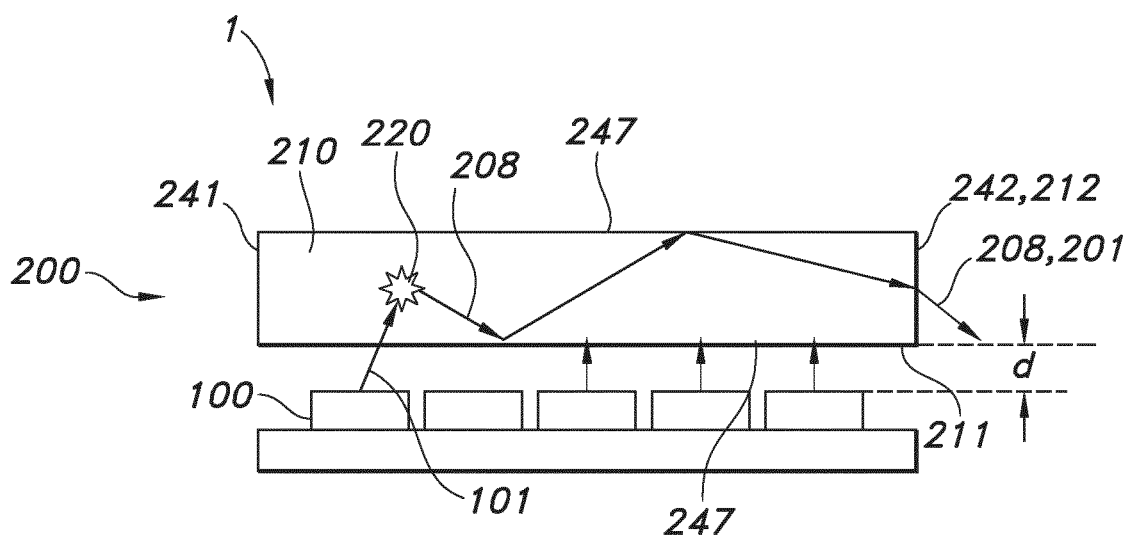

For this purpose, it is possible to make use of so-called light converter elements where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 1e).

Figure 2A:
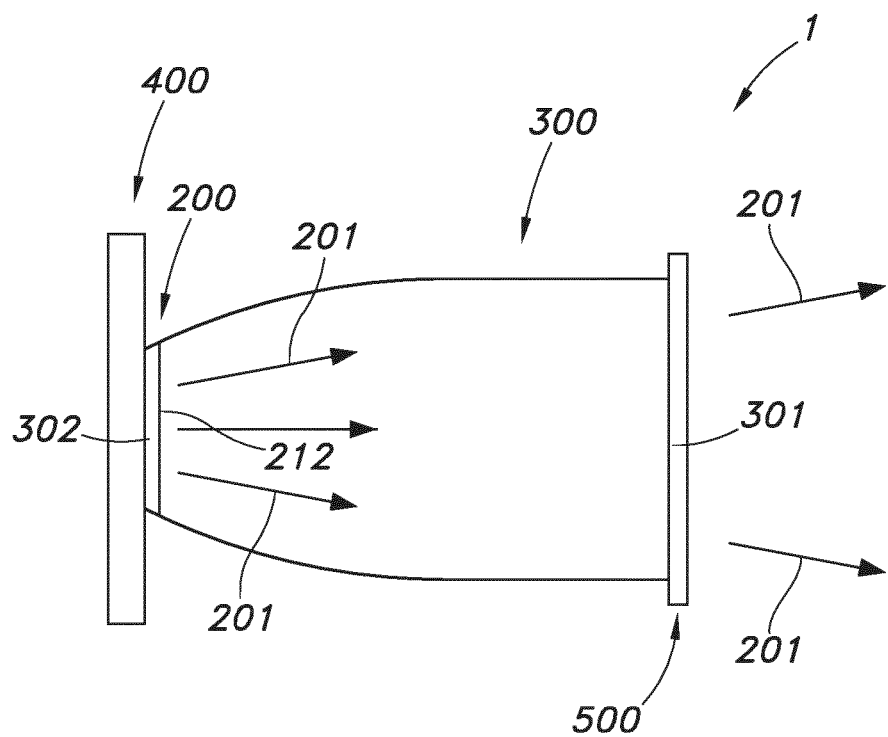
FIGS. 2a-2g schematically depict some further aspects of the invention.

FIG. 2a schematically depicts a light converter element 200, configured to convert at least part of light source light (not shown) into light converter light 201. Further, a compound parabolic concentrator 300 is schematically depicted, having a first end 301 and a second end 302, and having a shape tapering from the first end 301 to the second end 302, as known in the art. The light converter element 200 is configured at the second end 302 of the compound parabolic concentrator 300. The light converter elements 200 and the compound parabolic concentrators 300 are configured to provide light converter light 201 emanating from the first end 301 of the compound parabolic concentrator 300. Further, the light converter element 200 is in thermal contact with a heat sink 400. Here, the light converter element may e.g. have a disk shape or plate shape. Note that the light converter element may have a light exit window having substantially the same shape and dimensions as the second end of the CPC.

For instance, the CPC is mounted on a Lumiramic or ceramic phosphor plate which in turn is mounted on a heat sink. Blue light can be injected from the right side (not shown) which is generated by blue LED's or blue lasers or another light source which is concentrated onto the Lumiramic phosphor plate, and the converted light is coupled out again through the CPC towards the right side in reflective mode. Herein, the term "Lumiramic" refers to a ceramic luminescent material, especially a ceramic luminescent body or luminescent ceramic body, such as a plate. However, the invention is not limited to lumiramics as light converter elements.

Figure 2B:
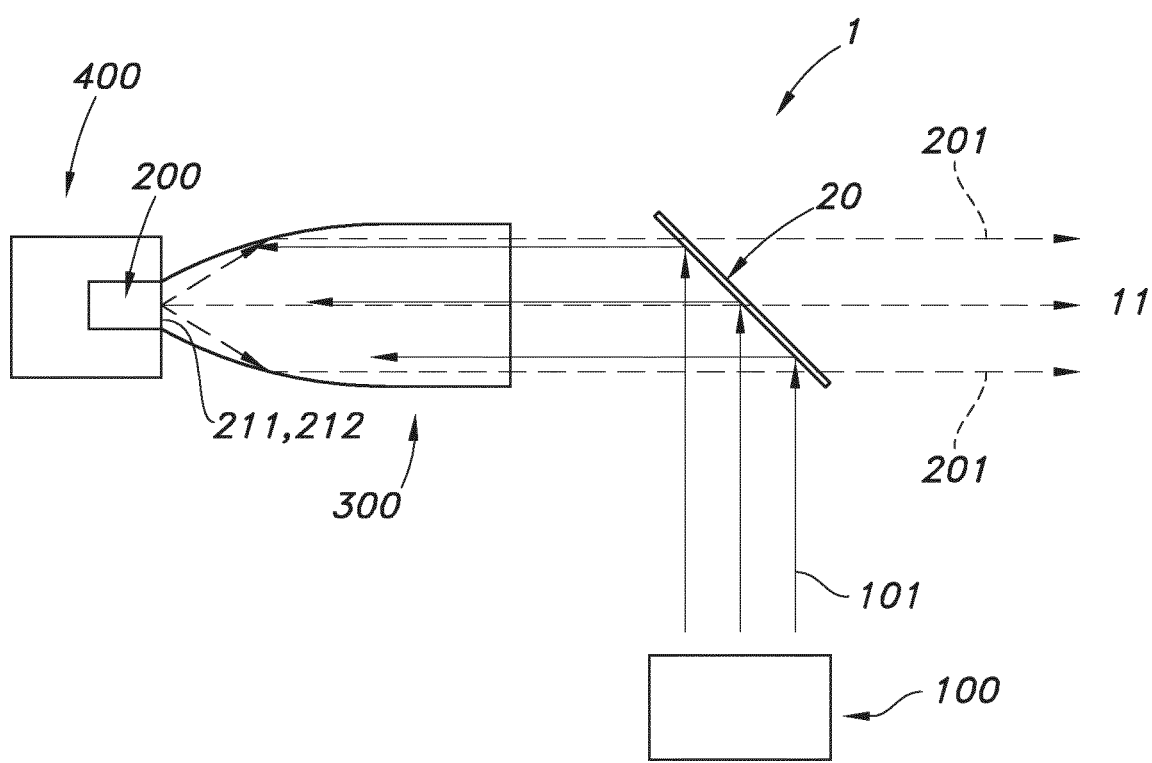

Instead of the thin Lumiramic plate as shown in FIG. 2a, also a small rod of phosphor material can be used which has the advantage that a larger contact area can be created between the phosphor material and the heat sink as shown in FIG. 2b. Here, also optics 20, such as a dichroic mirror, are schematically depicted to separate the excitation light or light source light 101 from the light converter light 201. Note that in FIG. 2b the light input face 211 and light exit window 212 substantially are identical (coincide).

Figure 2C:
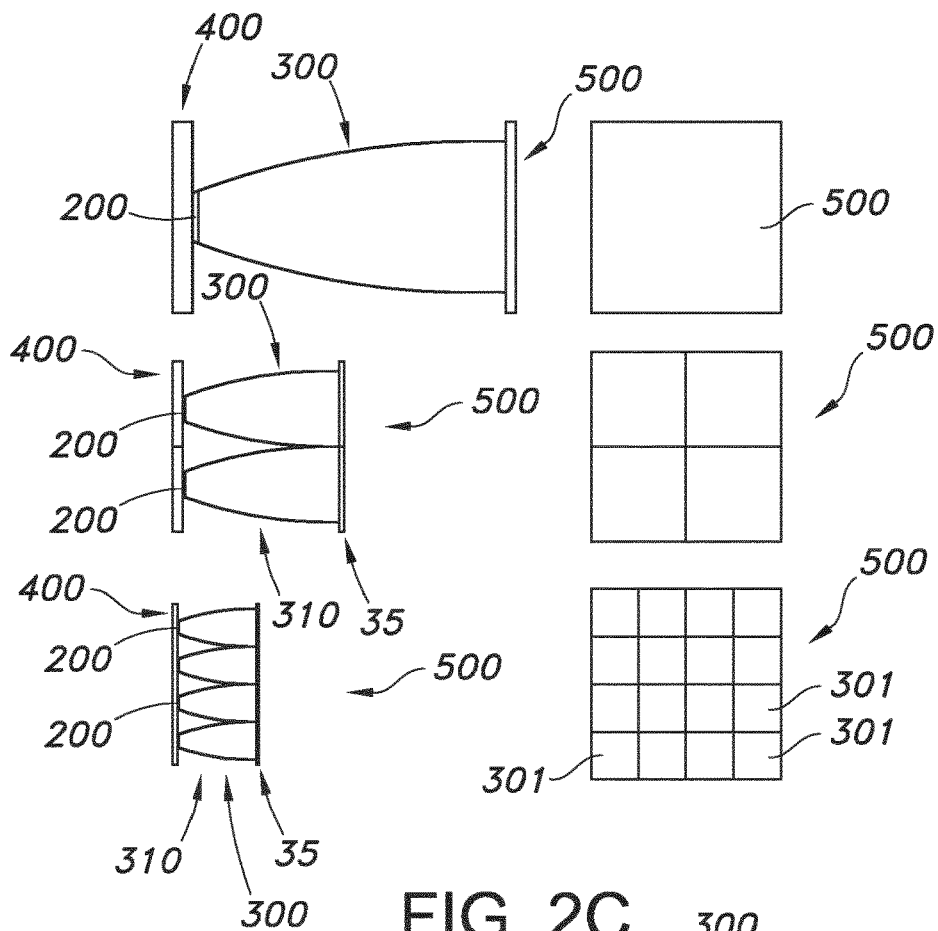

A single CPC 200 can be split up an array 310 of smaller CPCs 200 and smaller sources. FIG. 2c shows the principle of the invention. On the top of this Figure, a single CPC is drawn. Below this drawing a 2×2 and a 4×4 array have been drawn, of which the total source size and the total CPC exit size are equal to the single CPC. All devices have a similar etendue (area*solid angle) and the same total source size and CPC exit size. Hence, the exit area covered by the single CPC is equal to the exit area of the CPC arrays. The CPC array can be made by stacking many small CPCs or can be made out of one piece or body 35. Hence, the array of CPCs may be configured as monolithic element.

Figure 2D:
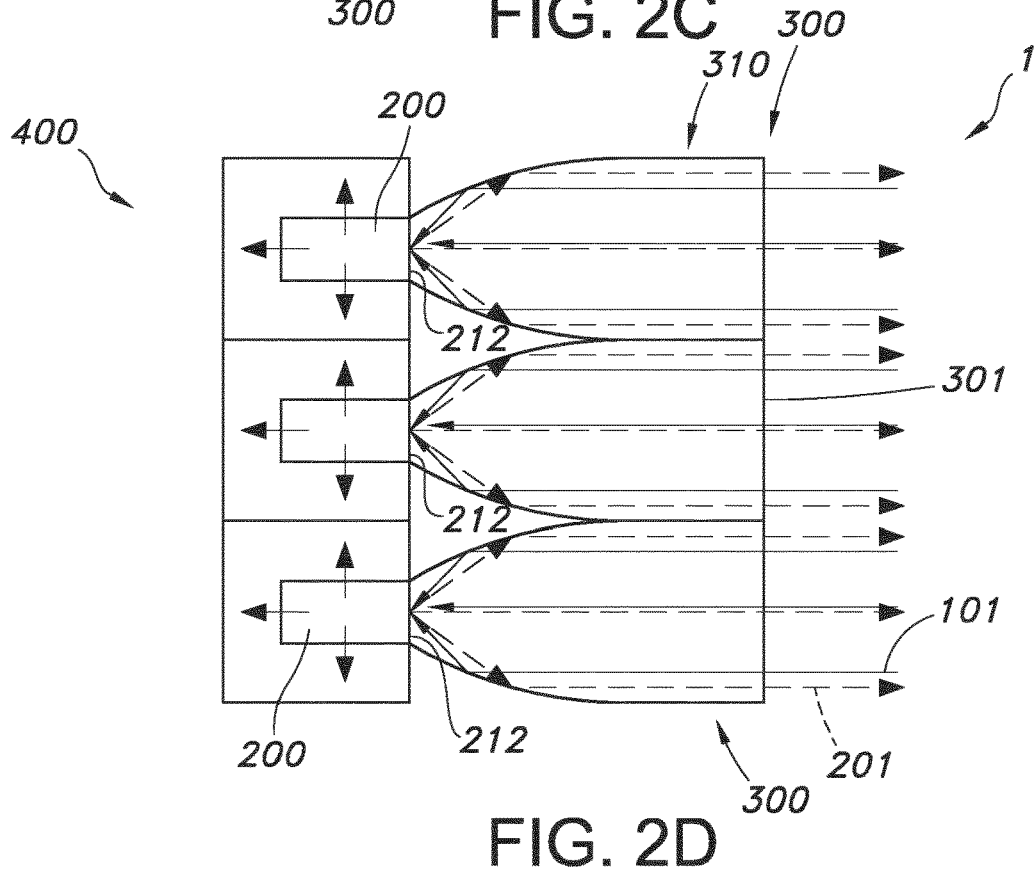
Figure 2E:
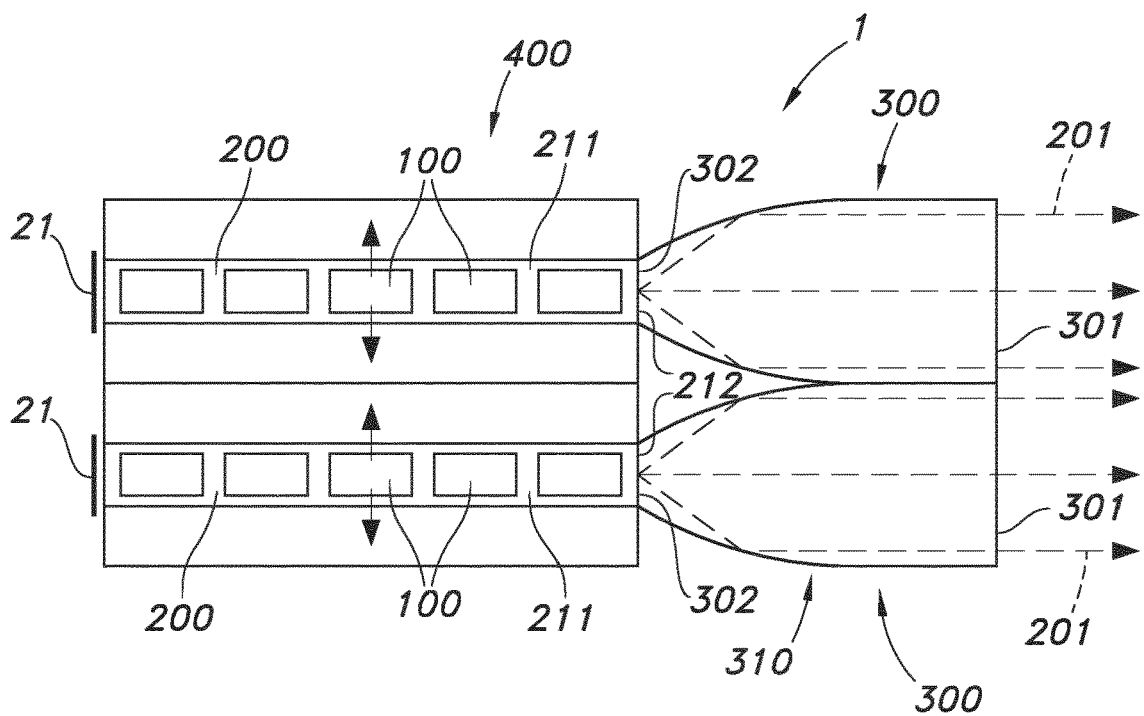

Apart from thin Lumiramic phosphor plates attached to a CPC array, the array may also be combined with luminescent rods (Lumirods) similar to the rods that are used in the HLD (High lumen density) technology for LED pumped high brightness sources in digital projection. FIGS. 2d and 2e shows examples of such configurations in both laser pumped reflective as well as LED pumped transmissive mode. FIG. 2d schematically depicts a CPC-Lumirod array operated in reflective mode excited by laser light, especially a solid state laser, e.g. laser pumped via a configuration as schematically depicted in FIG. 2b. Each light converter element 200 may be irradiated by a single laser. In yet other embodiments, a plurality of light converter elements are irradiated by a single laser. By using optics, the light source light of the laser may be distributed over two or more light converter elements. FIG. 2e schematically depicts an array of Lumirods cooled from 2-sides and LED pumped by 2-sides (top-bottom edge lighting). The term "lumirod" is especially applied for luminescent ceramic bodies that are elongated, irrespective of their cross-section (see also FIG. 1c). However, the invention is not limited to lumirods as light converter elements. Note that in the schematic drawing 2e, which can e.g. be a side view, the non-zero distance of the light source cannot be seen, such as in FIGS. 1a, 1b, and 1e. Note that in FIG. 2e the light exit window 212 and the light input face 211 are configured substantially perpendicular. In FIG. 2e, and other figures, light emanating from the array of CPCs can also be indicated as device light. Optionally, the light may further be subjected to optics, including optical filters, diffusers, etc.

Figure 2F:
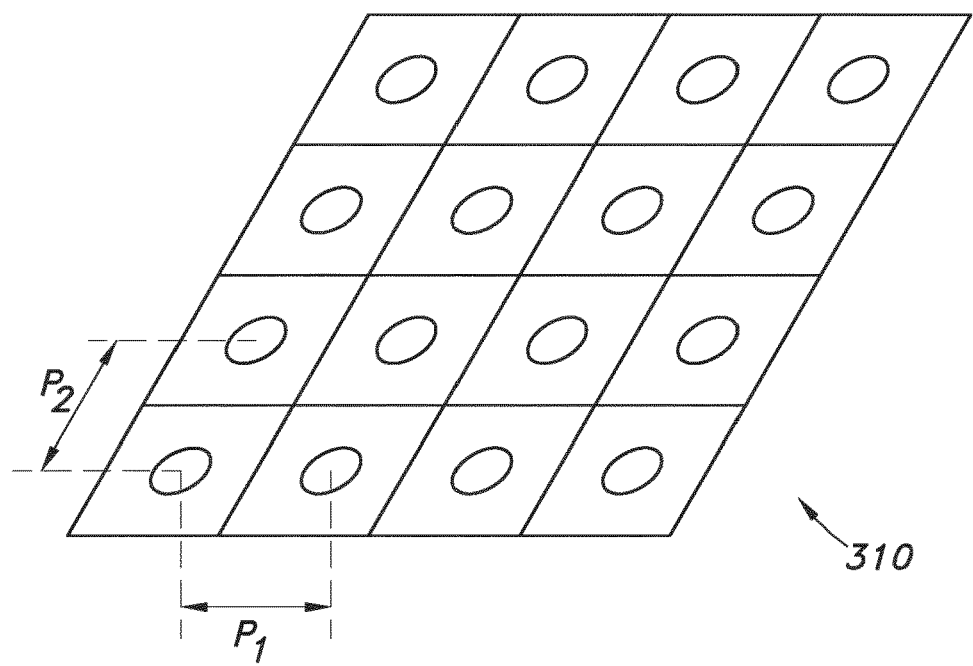

FIG. 2f schematically depicts an exit face or exit window 500 of a 4×4 array. Maximum intensities are indicated with the circles. The ratio between minimum intensity (i.e. between the maxima) and maximum intensity may be in the range of about smaller than 1:1 to about 1:10, such as in the range of about 1:1.2-1:5, like in the range of 1:1.5-1:4; the pitches, indicated with references P1 and P2 may (independently) be in the range of 2-50 mm. The output intensity of a CPC mounted on a Lambertian source is not homogenous over the exit surface, which shows a depression in the center of the CPC. By using a CPC array, these inhomogeneities are shifted to higher spatial frequencies making it easier to remove these inhomogeneities by e.g. a diffuser.

With a plurality of light sources 100, in embodiments two or more subsets of each one or more light sources may independently be controlled (i.e. controlling light source light intensity), such as for beam intensity control.

Figure 2G:
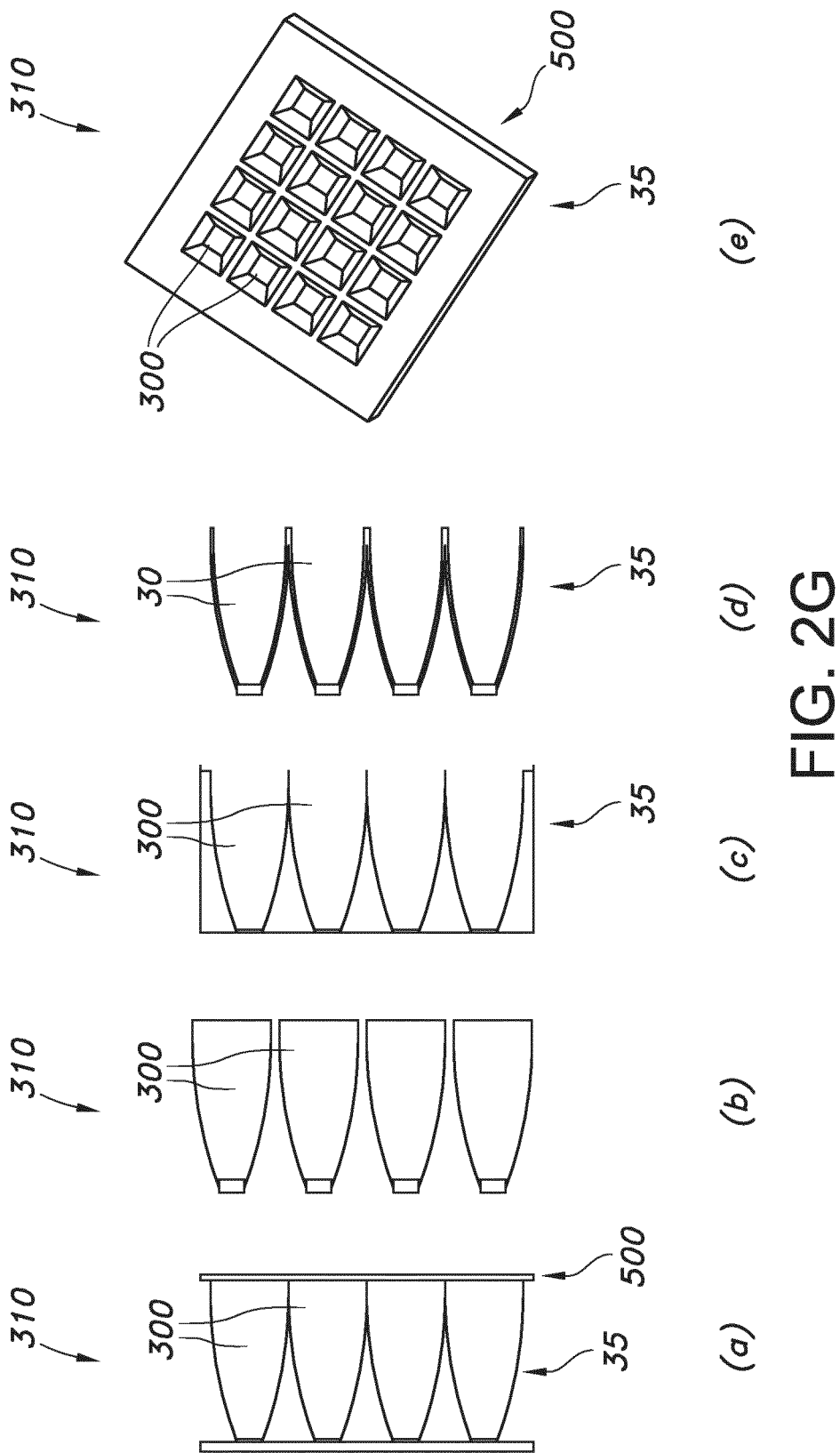

The CPC array can be realized in several ways. FIG. 2g shows some possibilities. Embodiments a and b show options for a filled CPC collimator. In this case the CPC is made of an optical transparent material like glass, plastic or optical silicones. This can be realized by moulding or injection moulding. In case of embodiment a, the array is made as one component, in embodiment b the array is realized by stacking a number of individual CPCs. Embodiments c and d show versions of non-filled CPC arrays that require a reflective coating. In case of embodiment c the CPC array shape could be made by injection moulding of a suitable material with a reflective coating deposited on the inner surface of the CPCs. Embodiment d shows a version of the CPC array that is made out of metal sheet by folding or deep-drawing (cross section and 3D rendering). Embodiment e provides a top view of e.g. embodiments c or d.

Simulations showed that for e.g. a Lumiramic architecture excited with laser light in reflective mode for projection applications, the thermal resistance from Lumiramic to heat sink can be reduced from 5.4 K/W for the single CPC Lumiramic architecture (see top line in FIG. 7) to ~5.0 K/W for a 4×CPC Lumiramic array as a whole.

Compared to a single CPC array at the same exit window, the optic is much smaller and the generated heat in the phosphor is much more spread over the spatially separated phosphor components. In a LED-pumped transmissive configuration, when an array of 2 CPCs is used instead of 1 large CPC, the size of the Lumirods may be also halved. The rod may be cooled in 2 directions by clamping between heatsink blocks (such as copper blocks) and pumped in the 2 other directions by blue LED arrays (see also FIG. 2e). As a consequence smaller sized LED pumps may be used at a double amount. Smaller LED chips of lower individual power, spread over a larger area (PCB) may lead to a higher pump efficiency compare to the higher power LEDs of the single CPC case, at a similar overall pump output.

A similar simulation has been made to compare a single CPC on a 1.2 mm×1.9 mm×4.0 mm Lumirod with a 2×2 CPC array on 40.6 mm×0.95 mm×4 mm Lumirods. The results are shown in FIG. 10 below. In this case the improvement of the thermal resistance is significant, going down from 6.0° C./W to 1.8° C./W.

The CPC array also helps to shorten the light-path as can be seen in FIG. 2c which also allows for a more robust mounting (gluing) between the CPC and the phosphor material. A 4×4 CPC array will have about ¼ of the length of a single CPC. A shorter build length allows the source to take-up less space in a projector where the available space is limited. Smaller components will also reduce component cost since less material is needed and molding times can be reduced. Furthermore the multiple attach positions of a CPC array compared to a single array can help to make the device more reliable/mechanically robust.

The output intensity of a CPC mounted on a Lambertian source is not homogenous over the exit surface, which shows a depression in the center of the CPC. By using a CPC array, these inhomogeneities are shifted to higher spatial frequencies making it easier to remove these inhomogeneities by e.g. a diffuser.

Finally, the aspect ratio of the output can easily be changed by the arrangement. Square-shaped CPC can be used and they can be arranged in a rectangular grid with an aspect ratio corresponding to the required ratio in the display application, e.g. 16:9.

Amongst others, a ceramic polycrystalline phosphor plate (Lumiramic) may be applied. However, it could also be another layer of phosphor type, such as a single crystal phosphor plate or a phosphor layer consisting of powder phosphor embedded/dispersed in a binder material, such as a silicone, or embedded in a polymeric material. The plates may need a thermal interconnect to the heatsink as well as the CPC array, such as a silicone glue layer giving extra thermal resistance, whereas the powder phosphor silicone layer may directly stick to the heatsink and CPC to form by itself the interconnect. Furthermore, it could also be small Lumirods that are laterally cooled to heatsinks, or a LED, or a combination of these sources within the array.

In embodiments, a square arrangement of square CPCs may be applied. However, also other shapes of CPC shapes and arrangements can be envisioned, such a hexagonal CPC and arrangement or a rectangular arrangement using square CPCs.

The invention can be used in any high brightness source where it is important that a single source is generated. Which is the case in digital projection or spot lights for e.g. entertainment lighting.

Therefore, Compound Parabolic Concentrators (CPCs) are often used to collimate a beam from flat Lambertian light sources like LEDs while maintaining the etendue of the source. In case a single beam is required like in the case of digital projection, all the light has to be generated within a small volume leading to thermal challenges to keep the temperature of the light source within the limits. Furthermore, the digital projection application may especially require a substantially spatially uniform light source, which the CPC does not deliver. This invention proposes to use a CPC array which enables to spread the heat while staying within the same etendue limitations and the characteristics of a single source. Furthermore the spatial uniformity is greatly improved and the light engine becomes more compact.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
   a plurality of light sources configured to generate light source light,
   a plurality of light converter elements, wherein each light converter element is radiationally coupled with one or more light sources, wherein the light sources are configured at a non-zero distance from the light converter elements,
   wherein the light converter elements are configured to convert at least part of the light source light into light converter light;

the lighting device further comprising:
a plurality of compound parabolic concentrators configured in an array, each compound parabolic concentrator having a first end and a second end, and having a shape tapering from the first end to the second end,
wherein the light converter elements are configured at the second ends of the compound parabolic concentrators, wherein the light converter elements and the compound parabolic concentrators are configured to provide light converter light emanating from the first ends of the compound parabolic concentrators, and
wherein the light converter elements are in thermal contact with a heat sink wherein the light sources are configured to irradiate the light converter elements via the compound parabolic concentrators;
wherein each light converter element comprises an elongated light transmissive body comprising a luminescent ceramic material, the elongated light transmissive body having a first face and a second face defining a length (L) of the elongated light transmissive body,
wherein the second face comprises a radiation input window and a radiation exit window, wherein the second face of the elongated light transmissive body is configured at the second end of the compound parabolic reflector, and
wherein the heat sink at least partly perimetrically surrounds the light converter elements.

2. The lighting device according to claim 1, wherein the light converter elements comprise luminescent single crystals.

3. The lighting device according to claim 1, wherein each light converter element comprises two or more faces in physical contact with the heat sink.

4. The lighting device according to claim 1, wherein the light sources are configured to edge light the light converter elements.

5. The lighting device according to claim 1, further comprising optics for separating light source light and light converter light, and wherein the light sources comprise lasers.

6. The lighting device according to claim 1, wherein the light sources are configured to provide to at least one face of each of the light converter elements a photon flux of at least $1.0*10^{17}$ photons/(s·mm$^2$).

7. The lighting device according to claim 1, wherein the array comprises n×m compound parabolic concentrators, wherein n≥2 and wherein m≥2.

8. The lighting device according to claim 1, wherein the array has an array length and an array width having a ratio L1:W1 of 16:9.

9. The lighting device according to claim 1, further comprising a light exit window, wherein the light exit window is configured downstream of the first ends of the compound parabolic concentrators or wherein the light exit window comprises the first ends of the compound parabolic concentrators.

10. The lighting device according to claim 1, wherein the compound parabolic concentrators, optionally together with the light exit window, are configured as a single body.

11. A lighting system, selected from the group consisting of an entertainment lighting system and a digital projector, comprising one or more lighting devices according to claim 1.

* * * * *